United States Patent [19]

Stover

[11] Patent Number: 4,570,368
[45] Date of Patent: Feb. 18, 1986

[54] LABEL FOR PLANTS AND NURSERY STOCK

[75] Inventor: Gary L. Stover, Ormond Beach, Fla.

[73] Assignee: Economy Label Sales, Inc., Daytona Beach, Fla.

[21] Appl. No.: 715,386

[22] Filed: Mar. 25, 1985

[51] Int. Cl.$^4$ ............................................. G09F 3/18
[52] U.S. Cl. .................................. 40/10 C; 40/21 R; 24/16 PB
[58] Field of Search ............... 40/10 C, 21 R, 304; 24/16 PB, 17 AP, 30 SS; 283/80; D20/43

[56] References Cited

U.S. PATENT DOCUMENTS

| | | | |
|---|---|---|---|
| 2,554,105 | 5/1951 | Heinle | 40/21 R |
| 2,642,684 | 6/1953 | Watts | 40/10 C |
| 3,197,830 | 8/1965 | Hoadley | 24/16 PB |
| 3,757,936 | 9/1973 | Lindegren | 24/16 PB |
| 3,834,824 | 9/1974 | Jahn | 24/16 PB |

FOREIGN PATENT DOCUMENTS 459 of 1889 United Kingdom ............... 40/21 R

Primary Examiner—Gene Mancene
Assistant Examiner—Cary E. Stone
Attorney, Agent, or Firm—Macdonald J. Wiggins

[57] ABSTRACT

A label is formed from a thin, stiff card having a tongue portion defined by a cut along an edge of the card. Two or more tabs may extend from the tongue portion. A hole is punched in a corner of the card. To install the label, the tongue is folded in a loop around a branch, stem, or trunk of the plant, and inserted through the hole. The tongue is pulled through the hole, causing a tab to ratchet, holding the label securely in place.

6 Claims, 4 Drawing Figures

LABEL FOR PLANTS AND NURSERY STOCK

BACKGROUND OF THE INVENTION

1. Field of the Invention

The present invention relates to labels used to identify plants and nursery stock, and more particularly to a one-piece easily attachable label having a large area for information.

2. Description of the Prior Art

In the nursery business, it is important to have a label or tag which can be attached to plants of all sizes and which can be quickly and easily installed without injury to the plant. Furthermore, it is highly desirable that the label have sufficient space that a variety of information can be printed or written thereon. It is common to fold strips of thin cardboard or plastic around the limbs or trunks of plants and to hold these in place by stapling or other type of fastener. Typical of the prior art are the labels taught in the following U.S. Pat. Nos.: Storer 59,678; Heinle 2,554,105; Watts 2,642,684; Sage 2,799,953; Wheeler 3,775,882; and Alexander et al 4,379,372.

SUMMARY OF THE INVENTION

The present invention is a simple, low cost label having a generous space for entering data and which is convenient to store, apply, and remove from plants.

Although the label can be made in a variety of sizes, it has been found that a $2\frac{1}{2}''\times4\frac{1}{2}''$ format is suitable. The label may be formed from a thin, stiff cardboard or plastic material having a surface suitable for pencil or ink marking. A narrow, elongate tongue is defined along an edge of the card by partially cutting along the edge to within about $\frac{1}{2}''$ of one corner. The tongue may be on the order of 0.2'' in width. In cutting the card to form the tongue, a pair of ratcheting tabs are formed projecting from one edge of the tongue. As will now be understood, the tongue includes a free distal end and is attached to the card at its proximal end. Adjacent the proximal end of the tongue, a hole is punched in the corner of the card having a diameter essentially that of the width of the tongue.

To apply the label to a plant, the tongue is folded upward from the card at essentially a right angle and the tongue is formed into a curve and folded around a branch, stem or trunk of the plant. The distal end of the tongue is inserted in the hole and threaded therethrough. By a slight pull on the tongue, the tab or tabs which are larger than the hole diameter will ratchet through the opening and will therefore serve to hold the tongue in place. Ratchet tabs may be provided at any desired location along the tongue and will permit the size of the loop left in the tongue after inserting through the hole to be selected. When it is desired to remove the label, it is only necessary to pull the tongue back through the hole to release the label from the plant.

It is therefore a principal object of the invention to provide a simple, low cost label for plants and the like which can be quickly and easily installed.

It is another object of the invention to provide a plant label which is formed from a single rectangular card stock which is easily handled and stored.

It is another object of the invention to provide a label in which an attaching tongue is formed along one edge of a card to engage an opening in the corner of the card.

These and other objects and advantages of the invention will become apparent from the following detailed description when read in conjunction with the drawings.

DETAILED DESCRIPTION OF THE PREFERRED EMBODIMENT

Figure 1:
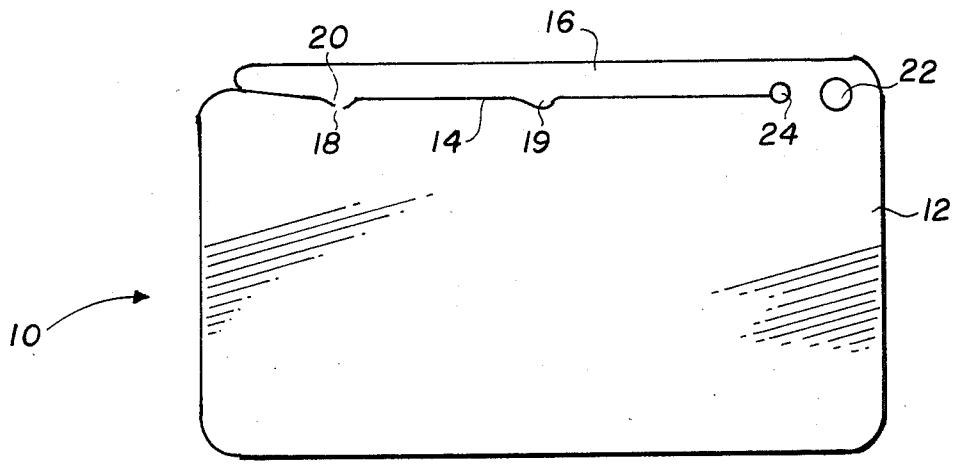
FIG. 1 is a plan view of a label in accordance with the invention.

Although the label of the invention can be made in a variety of sizes, a convenient size is on the order of $2\frac{1}{2}''\times4\frac{1}{2}''$. In FIG. 1, a typical label 10 in accordance with the invention is shown. Label 10 includes a body portion 12 formed from thin stock of stiff cardboard or plastic. It is required that the surface of body 12 accept pencil or ink to permit entering of information on the label. A tongue 16 is defined along a longitudinal edge of body 12 by a cut 14. Cut 14 terminates in a small hinge hole 24. Cut 14 also defines a pair of tabs 20 and 19 which project inward from tongue 16. During manufacture, it is preferred that the cut 14 be incomplete at the inner edge of tab 20 as indicated at 18. This incomplete cut 18 permits the label to remain flat during shipping and storage but is easily broken when applying the label.

A second hole 22 is punched in a corner adjacent hinge hole 24. The diameter of second hole 22 is approximately the same as the width of tongue 16.

Figure 2:
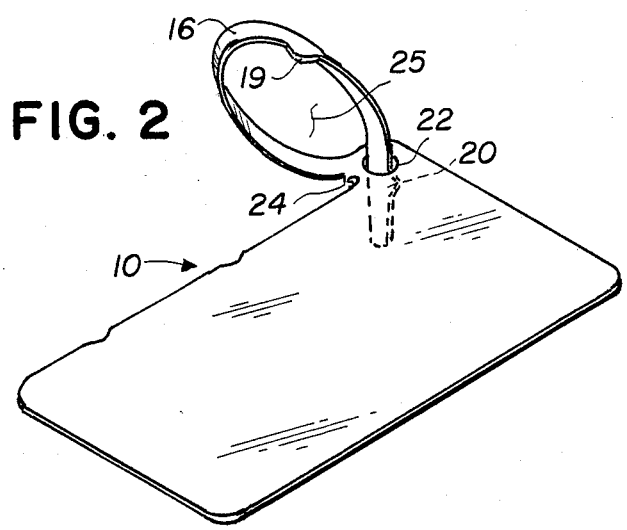
FIG. 2 is a perspective view of the label of FIG. 1 having its tongue inserted into a hole to form a large loop for encircling a trunk or limb of a plant.
Figure 4:
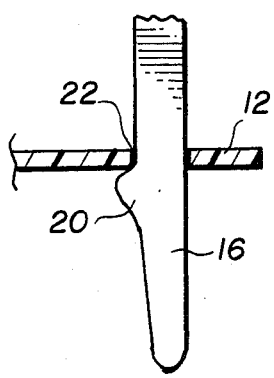
FIG. 4 is a cross-sectional view of the tongue inserted into the hole and the card illustrating the locking effect of the tabs.
Figure 3:
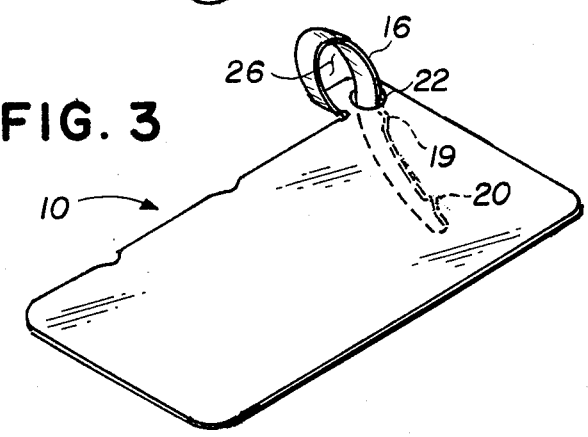
FIG. 3 is a perspective view of the label of FIG. 1 showing the formation of a small loop in the tongue for attachment to stems or small limbs.

Turning now to FIGS. 2 and 3, the manner of forming a locked loop in tongue 16 to permit attachment to plants is illustrated. In FIG. 2, tongue 16 has been broken loose at point 18 from body 12 and has been curled over the slightly tapered distal end of tongue 16 inserted through second hole 22. Hinge hole 24 causes the proximal end of tongue 16 to bend easily without warping body 12. Tongue 16 is forced downward as illustrated in the cross-sectional view of FIG. 4 until tab 20 is pushed through second hole 22 by virtue of the flexibility of the card stock. Tab 20 thus acts as a ratchet to hold tongue 16 in a large loop 25. Thus, the configuration of FIG. 2 is useful when the label is used with plants having relatively large trunks or branches.

When a smaller plant is to be labelled, the same process as described with respect to FIG. 2 is followed and the tongue 16 is pulled through second hole 22 until the second tab 19 is pulled through to hold the small loop 26 in place as seen in FIG. 3.

When it is desired to remove the label 10 from a plant, one holds the body portion 12 and pulls sharply in the loop 25 or 26 which will pull tabs 19 and 20 back through second hole 22 releasing the label. With some care in removing, the label may be reused since it is not necessary to destory it as in some prior art labels.

Although an example of the invention has been described having two tabs 19 and 20, it is clear that additional tabs can be provided if desired to form various loop sizes. Although a particular size and shape of the label has been described for exemplary purposes, any desirable shape or size may be used without departing from the spirit or scope of the invention.

I claim:

1. A label for a plant comprising:
 an essentially rectangular card formed from thin, flexible stock and having a hole therethrough in a first corner thereof;
 a narrow tongue having a free distal end, and a proximal end attached to said card adjacent to said first corner thereof, said tongue defined by a cut along one edge of said card;
 at least two tabs projecting from an edge of said narrow tongue; and
 a loop for encircling a part of a plant to be labelled formed by pulling said free distal end of said tongue through said hole until a selected one of said tabs ratchets through said hole.

2. The label as recited in claim 1 in which a surface of said card is suitable for marking with pencil and ink.

3. The label as recited in claim 1 in which said card is formed from cardboard.

4. The label as recited in claim 1 in which said card is formed from plastic.

5. The label as recited in claim 1 in which said cut along one edge of said card is incomplete near said distal end of said tongue for holding said tongue aligned with said card until a time of use thereof.

6. A label for a plant comprising;
 a thin, flexible planar card;
 a narrow tongue defined along an edge of said card by a cut therethrough, said tongue having a free distal end and a proximal end attached to said card, and at least one tab projecting from an edge thereof; and
 said card having a hole therethrough adjacent said proximal end for receiving the distal end of said tongue to thereby form a loop for encircling a portion of a plant, wherein said tab is pulled through said hole for securing said tongue in the form of said loop.

* * * * *